(12) United States Patent
Lee et al.

(10) Patent No.: US 8,615,113 B2
(45) Date of Patent: Dec. 24, 2013

(54) MULTI-VIEW FACE RECOGNITION METHOD AND SYSTEM

(75) Inventors: Jongha Lee, Hwaseong-gun (KR);
Xiangsheng Huang, Beijing (CN);
Jungbae Kim, Hwaseong-si (KR);
Seong-deok Lee, Suwon-si (KR)

(73) Assignees: Samsung Electronics Co., Ltd.,
Suwon-Si (KR); Beijing Samsung Telecom R&D Center, Beijing (CN)

( * ) Notice: Subject to any disclaimer, the term of this patent is extended or adjusted under 35 U.S.C. 154(b) by 1397 days.

(21) Appl. No.: 12/289,071

(22) Filed: Oct. 20, 2008

(65) Prior Publication Data

US 2009/0180671 A1 Jul. 16, 2009

(30) Foreign Application Priority Data

Oct. 19, 2007 (CN) .......................... 2007 1 0164308
Aug. 27, 2008 (KR) ........................ 10-2008-0084039

(51) Int. Cl.
*G06K 9/00* (2006.01)

(52) U.S. Cl.
USPC ........... 382/118; 382/100; 382/115; 382/190; 382/224

(58) Field of Classification Search
USPC ................. 382/100, 115, 118, 159, 190, 224
See application file for complete search history.

(56) References Cited

U.S. PATENT DOCUMENTS

| | | | |
|---|---|---|---|
| 5,710,833 A * | 1/1998 | Moghaddam et al. ......... | 382/228 |
| 5,774,129 A * | 6/1998 | Poggio et al. ................. | 345/441 |
| 6,594,383 B1 * | 7/2003 | Syeda-Mahmood ......... | 382/162 |
| 6,964,023 B2 * | 11/2005 | Maes et al. ..................... | 715/811 |
| 7,050,607 B2 * | 5/2006 | Li et al. .......................... | 382/118 |
| 7,151,843 B2 * | 12/2006 | Rui et al. ........................ | 382/103 |
| 7,430,315 B2 * | 9/2008 | Yang et al. ..................... | 382/159 |
| 7,433,495 B2 * | 10/2008 | Rui et al. ........................ | 382/103 |
| 7,643,684 B2 * | 1/2010 | Lee et al. ....................... | 382/190 |
| 7,657,086 B2 * | 2/2010 | Gu .................................. | 382/159 |
| 7,783,085 B2 * | 8/2010 | Perlmutter et al. ............ | 382/118 |
| 7,991,199 B2 * | 8/2011 | Das ................................ | 382/115 |
| 8,055,028 B2 * | 11/2011 | Park et al. ...................... | 382/118 |
| 8,238,673 B2 * | 8/2012 | Mitarai et al. ................. | 382/227 |
| 2004/0197013 A1 * | 10/2004 | Kamei ........................... | 382/118 |
| 2005/0180627 A1 * | 8/2005 | Yang et al. ..................... | 382/159 |
| 2005/0187975 A1 * | 8/2005 | Yamane ..................... | 707/104.1 |
| 2005/0201595 A1 * | 9/2005 | Kamei ........................... | 382/118 |
| 2005/0210103 A1 * | 9/2005 | Rui et al. ........................ | 709/204 |
| 2007/0239764 A1 * | 10/2007 | Song et al. ..................... | 707/102 |
| 2008/0101705 A1 * | 5/2008 | Mohamed et al. ............ | 382/224 |
| 2008/0144891 A1 * | 6/2008 | Hwang et al. ................. | 382/118 |
| 2008/0187173 A1 * | 8/2008 | Kim et al. ...................... | 382/103 |
| 2008/0310720 A1 * | 12/2008 | Park et al. ...................... | 382/181 |
| 2009/0141974 A1 * | 6/2009 | Ono ............................... | 382/165 |
| 2009/0180671 A1 * | 7/2009 | Lee et al. ....................... | 382/118 |

* cited by examiner

*Primary Examiner* — Vu Le
*Assistant Examiner* — Aklilu Woldemariam
(74) *Attorney, Agent, or Firm* — Staas & Halsey LLP

(57) ABSTRACT

A multi-view face recognition method and system are provided. In the multi-view face recognition method, two images to be recognized are input, a linear projection matrix is calculated based on grouped images in a training set, two feature vectors corresponding to the two input images are extracted based on the linear projection matrix, a distance between the two extracted feature vectors is calculated, and it is determined based on the distance between the two feature vectors whether the two input images belong to a same person.

17 Claims, 14 Drawing Sheets

MULTI-VIEW FACE RECOGNITION METHOD AND SYSTEM

CROSS-REFERENCE TO RELATED APPLICATIONS

This application claims the benefit of Chinese Patent Application No. 200710164308.X, filed on Oct. 19, 2007, in the Chinese Intellectual Property Office and Korean Patent Application No. 10-2008-0084039, filed on Aug. 27, 2008, in the Korean Intellectual Property Office, the disclosures of which are incorporated herein in their entirety by reference.

BACKGROUND

1. Field

One or more embodiments of the present invention relate to a face recognition method and system, and more particularly, to a multi-view face recognition method and system based on sub sets.

2. Description of the Related Art

With the development of computers and pattern recognition technology, face recognition technology is widely applied to many different fields, such as the field of security.

Conventionally, a plurality of methods for the recognition of faces at various angles have been proposed. There are three main methods including: a first method in which a plurality of face images including various views of a face are registered; a second method in which big-pose face images are corrected geometrically; and a third method, which is a linearly classifying method in which face images of various poses of the same person are used to calculate changes within-class. There are corresponding problems related to each of the above three methods. Although the first method can be applied to some cases, the first method cannot be applied to a case in which only one image or a limited number of images can be registered. For example, in a recognizing system for tracking on the internet, since only a limited number of pictures can be obtained in advance, only a limited number of pictures can be registered. Thus, the first method cannot be applied to this recognizing system. As for the second method, there are mainly two problems in the method: first, since the computation of a correction operation needs a great deal of time, the second method cannot be applied to an embedded system, especially, to a mobile phone or to a digital camera, and it is difficult to ensure that the correction can satisfy the requirements; and second, a new distortion of an image may be induced by the correction, which may cause the image recognition to be more difficult. As for the third method, even for images of the same person, changes in different pose images are very significant, and the changes among different images may be non-linear. Therefore, if linear calculation is applied to calculate all the images of all the poses, a face recognition model will be distorted. Thus, it is impossible to present face images correctly. Accordingly, the third method may only be selectively used.

Consequently, in the field of face recognition, a face recognition method and system for meeting various demands and requiring less calculation is needed.

SUMMARY

Additional aspects and/or advantages will be set forth in part in the description which follows and, in part, will be apparent from the description, or may be learned by practice of the invention.

One or more embodiments of the present invention include a multi-view face recognition method including: inputting two images to be recognized; calculating a linear projection matrix based on grouped images in a training set; extracting two feature vectors corresponding to the two input images based on the linear projection matrix; calculating a distance between the two extracted feature vectors; and determining whether the two input images belong to a same person, based on the distance between the two feature vectors.

One or more embodiments of the present invention correspondingly include a multi-view face recognition system including: an inputting unit inputting two images to be recognized; a face recognition engine learning unit calculating a linear projection matrix based on grouped images in a training set; a feature extracting unit extracting two feature vectors corresponding to the two input images based on the linear projection matrix provided by the face recognition engine learning unit; a feature vector distance calculating unit calculating a distance between the two feature vectors extracted by the feature extracting unit; and a determining unit determining whether the two input images belong to a same person, based on the distance between the two feature vectors calculated by the feature vector distance calculating unit.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION OF EMBODIMENTS

Figure 1:
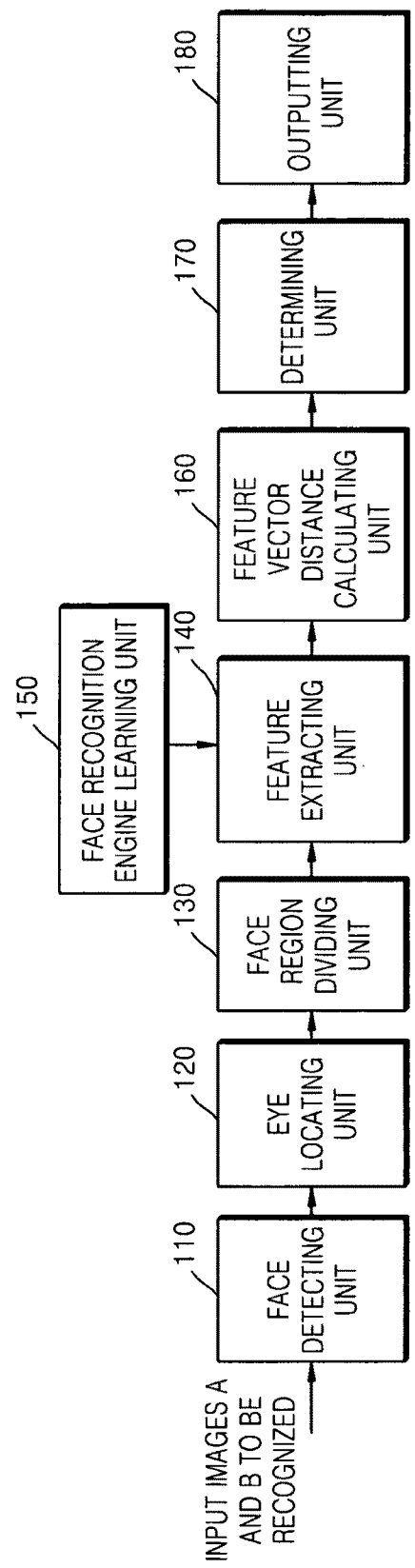
FIG. 1 is a block diagram of a face recognition system according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of a face recognition system 100 according to an embodiment of the present invention. Referring to FIG. 1, the face recognition system 100 includes a face detecting unit 110, an eye locating unit 120, a face region cropping unit 130, a feature extracting unit 140, a face recognition engine learning unit 150, a feature vector distance calculating unit 160, and a determining unit 170. Alternatively, the face recognition system 100 may further include an input unit 180 for inputting two images to be recognized, such as a keyboard, a mouse and a touch screen, etc. and an output unit 180 for outputting a result of the determination performed by the determining unit 170 and further outputting a result of the detection performed by the face detecting unit 110, such as a display, a speaker, etc.

Two images A and B to be recognized are input to the face detecting unit 110. The final aim of the face recognition system 100 is to determine whether the two images A and B are images (e.g., pictures) of the same person. The face detecting unit 110 detects positions of face regions from the input images A and B, and determines the sizes of faces. The face detection performed in the face detecting unit 110 may be performed according to a variety of conventional techniques. For example, the face detecting unit 110 may perform face detection using a maximum rejection method, wherein, firstly, a region which is an obvious face region is excluded using a simple divider; secondly, an image region which is an unobvious face region is excluded using a relatively complex divider; thirdly, an image region which is not a face region but appears similar to a face region is excluded. Thus, the region which is not excluded is the face region.

The face detecting unit 110 inputs images of the detected face regions (hereinafter, referred to as face region images) to the eye locating unit 120.

The eye locating unit 120 searches the face region images received from the face detecting unit 110 for the positions of the eyes and calculates coordinates of each of the two eyes in order to locate the eyes. An active shape model (ASM) technique is generally used to recognize a face image and a facial expression in the computer vision and pattern recognition field. The core algorithm of the ASM method mainly includes two sub models, namely, a global shape model and a part skin model. The ASM method can simultaneously and quickly locate feature points of a plurality of face images. The eye locating unit 120, according to the current embodiment, may locate eyes found in the face region images using the ASM technique, that is, by searching the face region images for the positions of eyelids and canthi and determining the positions of the eyes on the face region images. During the process of searching, a feature of gradient variations in the face regions is calculated, and positions mostly matching the gradient variations are searched from the ASM model, whereby the positions of eyelids and canthi of the images to be recognized are determined.

The eye locating unit 120 inputs the positions of the eyes of the two face region images to the face region cropping unit 130. The face region cropping unit 130 aligns the eyes at predetermined positions, and then rotates, moves horizontally, and scales the face region images according to the relationship between the positions of eyes of the face region images and predetermined eye positions, to obtain cropped face images with fixed sizes (hereinafter, referred to as face images A1 and B1). The face region cropping unit 130 transmits the cropped face images A1 and B1 to the feature extracting unit 140.

In another embodiment of the present invention, if the input images A and B are face images, the face detecting unit 110, the eye locating unit 120, and the face region cropping unit 130 may be omitted, and the face images may be directly input to the feature extracting unit 140.

The feature extracting unit 140 extracts feature vectors v1 and v2 from the face images A1 and B1, respectively, based on a linear projection matrix provided by the face recognition engine learning unit 150, and transmits the extracted feature vectors v1 and v2 to the feature vector distance calculating unit 160.

The feature vector distance calculating unit 160 calculates a distance between the feature vector v1 of the face image A1 and the feature vector v2 of the face image B1. In an embodiment, the feature vector distance calculating unit 160 may calculate the distance between the feature vectors v1 and v2 using a cosine distance calculation method. First, the square of a vector norm of the feature vector v1 for the face image A1 and the square of a vector norm of the feature vector v2 for the face image B1 are calculated using Equation 1 below.

$$\text{norm} = v[1]v[1] + v[2]v[2] + \ldots v[i]v[i] \ldots + v[N]v[N] \quad \text{Equation 1}$$

wherein v[i] denotes an i-th dimension of a vector v, and N denotes the dimension of the vector v.

Similarity "s" of the feature vectors v1 and v2 is calculated according to Equation 2 below.

$$s = v1[1]v2[1] + v1[2]v2[2] + \ldots v1[i]v2[i] \ldots + v1[N]v2[N] \quad \text{Equation 2}$$

wherein v1[i] illustrates the i-th dimension of the feature vector v1, v2[i] illustrates the i-th dimension of the feature vector v2, and N illustrates the dimension of the feature vectors v1 and v2.

Then, the similarity "s" is normalized using Equation 3 below.

$$s = v1[1]v2[1] + v1[2]v2[2] + \ldots v1[i]v2[i] \ldots + v1[N]v2[N]/(\text{sqrt}(\text{norm}1)\text{sqrt}(\text{norm}2)) \quad \text{Equation 3}$$

The similarity "s" between the two feature vectors v1 and v2 is transmitted to the determining unit 170.

The determining unit 170 judges the distance between the feature vectors v1 and v2 based on a preset threshold value and determines whether the images A and B to be recognized belong to the same person, that is, determines whether the person of image A is the person of image B. Alternatively, in another embodiment of the present invention, the determining unit 170 may determine whether images A and B belong to the same person, based on the cosine value of the angle between the two feature vectors v1 and v2.

Optionally, the determining unit 170 may output a result of the determination to the output unit 180 so that the output unit 180 may display the result of the determination to a user.

The face recognition system 100 according to an embodiment of the present invention has been described with reference to FIG. 1; however, it should be understood by those skilled in the art that the description is only illustrative and the present invention is not limited thereto.

The detailed structure and operation of the face recognition engine learning unit 150 will now be described with reference to FIG. 2.

Figure 2:
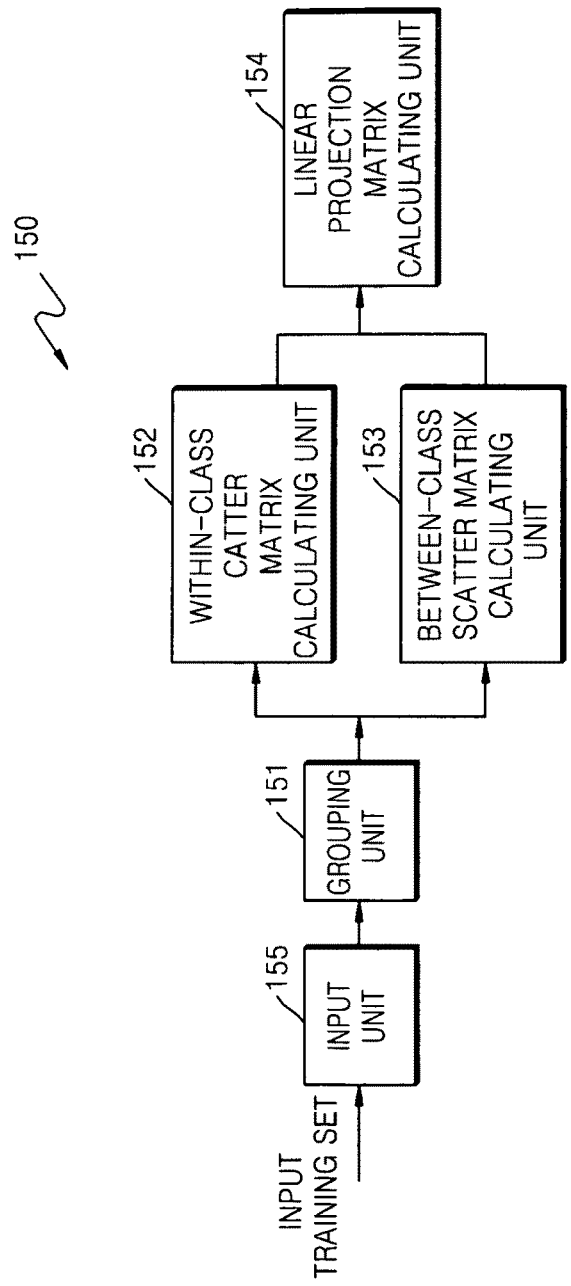
FIG. 2 is a block diagram for illustrating the detailed structure of a face recognition engine learning unit of the face recognition system illustrated in FIG. 1.

Referring to FIG. 2, the face recognition engine learning unit 150 may include a grouping unit 151, a within-class scatter matrix calculating unit 152, a between-class scatter matrix calculating unit 153, and a linear projection matrix calculating unit 154. Optionally, the face recognition engine learning unit 150 may further include an input unit 155 for inputting a training set including a plurality of images for different persons, such as a keyboard, a mouse, a touch screen, or the like.

The grouping unit 151 classifies the images of the input training set into groups. The images of the input training set are classified into groups according to each person. Changes among images within each group are not great, but images within each group still contain certain changes. For example, images having similar angles in the training set may be classified into an identical group according to the angles of the face of the same person. According to an embodiment, the grouping unit 151 uses a clustering method, in which images of the same person, which contain few changes in the training set, are automatically clustered into an identical group. The detailed operation of the grouping unit 151 will now be described.

It is assumed that n images are included in the training set and classified into k groups.

First, in step 1, k images will be arbitrarily selected from the n images to serve as initial clustering centers. Then, in step 2, similarities between the images remaining in the training set and the initial clustering centers are calculated, respectively. That is, a feature vector, such as a feature vector of a multi-scale and multi-direction Gabor wavelet, is extracted from each of the remaining images, and then a distance between the feature vector and each of the initial clustering centers is calculated, such as a cosine distance, a Euclid distance, and a Mahalanobis distance. The remaining images are allocated to a respective cluster represented by a cluster center which is most similar to each image, and new clusters are formed. In step 3, the cluster center for each of the new clusters, that is, the mean value of all the images in each of the new cluster, is calculated.

Step 2 and 3 are repeated until a standard measurement function is convergent. If a mean and a variance function are normally used as a standard measurement function, the mean and variances of the k groups that change little or do not change represent that the measurement function is convergent.

Figure 3:
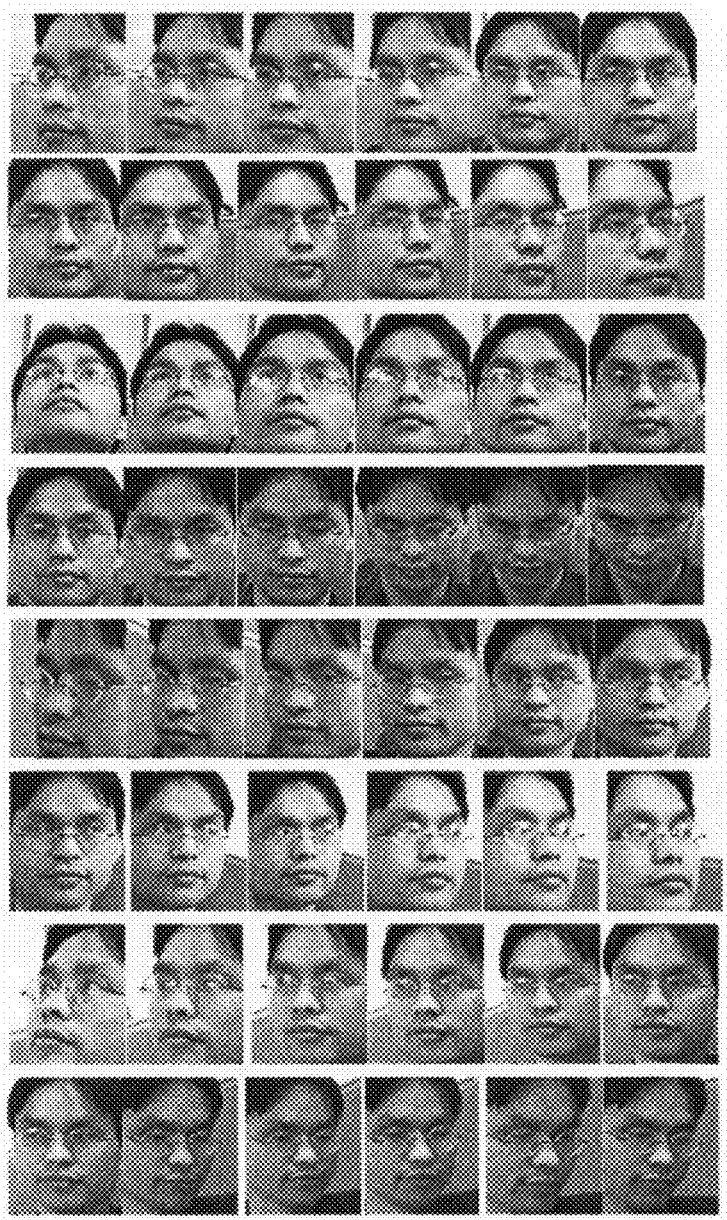
FIG. 3 illustrates 8 groups of face region images obtained by grouping training sets according to face poses described in the embodiment illustrated in FIG. 1.

FIG. 3 illustrates eight (8) groups of face region images obtained by grouping the images of the training set according to face poses. Referring to FIG. 3, group 1 includes from a front face to a right face, group 2 includes from a right face to a front face, group 3 includes from an upward-gazing face to a front face, group 4 includes from a front face to a downward-gazing face, group 5 includes from a left and upper face to a front face, group 6 includes from a front face to a right and lower face, group 7 includes from a right and upper face to a front face, and group 8 includes from a front face to a left and lower face.

In each of the groups of face region images, the face angles of the face region images are different from each other, but the differences between the face angles of the face region images are not relatively large. However, the changes in face angles between one group and another group are relatively large. For example, a difference between images of group 1 and group 3 is larger than that between images within either group 1 or group 3, respectively. In addition, in other embodiments of the present invention, the images of the training set can be grouped according to facial expression.

The grouping unit 151 transmits a result of the grouping to a within-class scatter matrix calculating unit 152 and a between-class scatter matrix calculating unit 153.

The within-class scatter matrix calculating unit 152 calculates a within-class scatter matrix of the face region images in each group based on the grouping result output by the grouping unit 151. The main concept for calculating the within-class scatter matrix is as follows. First, an image and another image of the same group form a pair of images, and a covariance matrix of the pair of images is calculated, that is, a covariance matrix of a difference image, formed by the difference between intensity values (or feature values of Gabor wavelet) of corresponding pixels in the pair of images, is calculated. Then, all the covariance matrixes for the images of the same group are accumulatively added together, and a sum resulting from the addition is divided by the number of covariance matrixes to thus obtain a within-class group scatter matrix, that is, a mean covariance matrix of one group of the same person. For example, if there are five images in a group, the number of covariance matrixes is ten.

The within-class group scatter matrixes of all the groups of the same person are added together, and a sum resulting from the addition is divided by the number of all the groups of the same person, to thereby obtain a person within-class scatter matrix corresponding to each person in the training set. To obtain a general within-class scatter matrix Sw, within-class scatter matrixes of all the persons in the training set are added together, and a sum resulting from the addition is divided by the number of persons included in the training set.

If the images included in a training set are classified into 8 groups according to each person and each of the groups includes 24 images, a within-class scatter matrix may be calculated using Equation 4 below.

$$S_w = \sum_{m=1}^{PN} \sum_{G_n \subset P_m, n=1}^{n=8} \left[ \sum_{i,j \in G_n, i \neq j} (x_i - x_j)^T \cdot (x_i - x_j) \right] \quad \text{Equation 4}$$

where i,j=1, 2 ... 24, $G_n$ denote the images included in one group, n=1, 2 ... 8, $P_m$ denotes the images for an m-th person, and PN denotes the number of persons.

Figure 4:
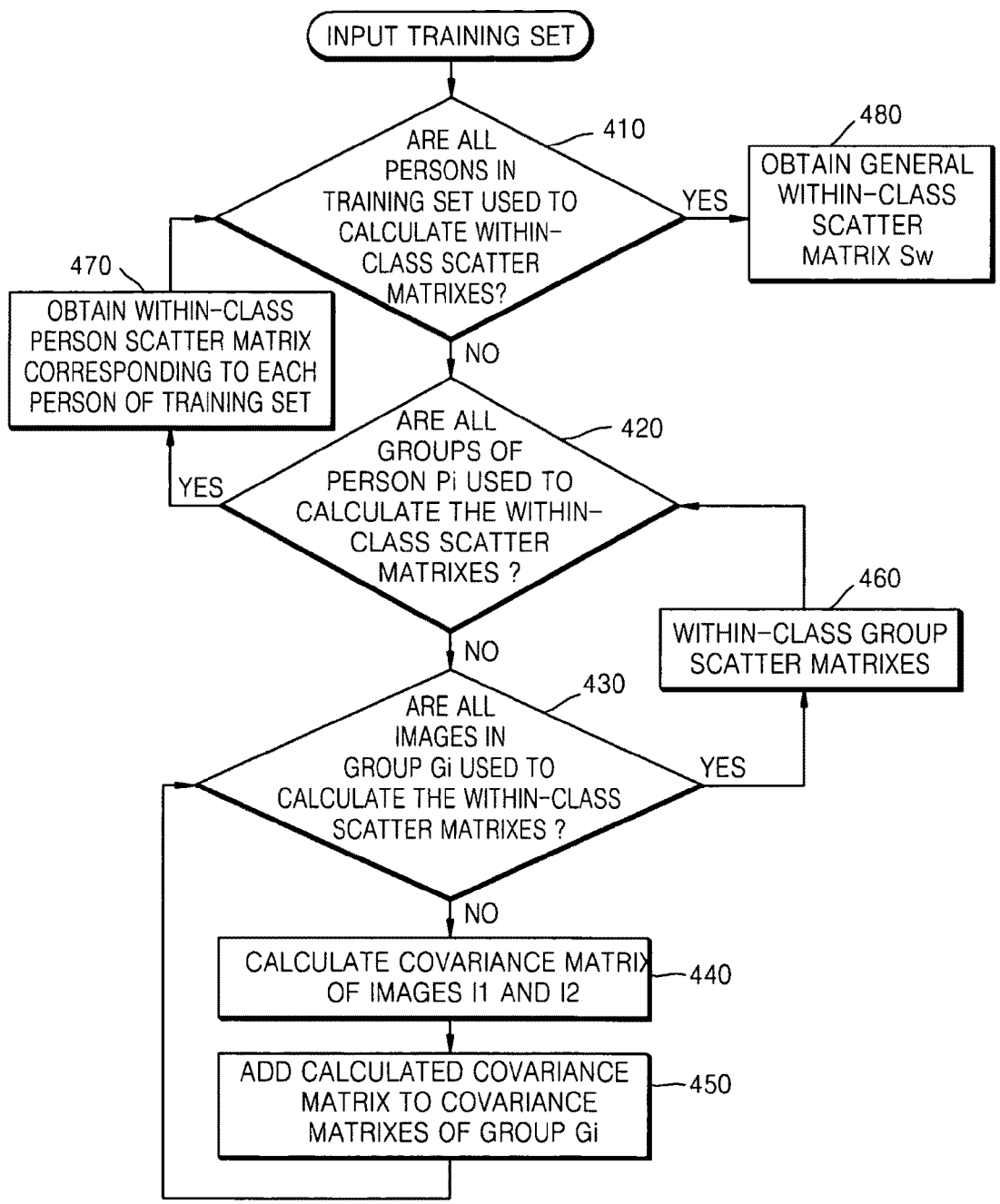
FIG. 4 is a flowchart of a method of calculating a within-class scatter matrix, according to an embodiment of the present invention.

FIG. 4 illustrates a flowchart of an operation of calculating the general within-class scatter matrix Sw using the within-class scatter matrix calculating unit 152.

Referring to FIG. 4, in operation S410, it is determined whether all the persons in the training set are used to calculate within-class scatter matrixes. If it is determined in operation S410 that a person Pi is not used to calculate the within-class scatter matrixes, it is determined whether all the groups of the person Pi are used to calculate the within-class scatter matrixes, in operation S420. If it is determined in operation S420 that group Gi of the person Pi is not used to calculate the within-class scatter matrixes, it is determined whether all the image in the group Gi are used to calculate the within-class scatter matrixes, in operation S430. If it is determined in operation S430 that images I1 and I2 are not used to calculate the within-class scatter matrixes, the covariance matrix of the images I1 and I2 is calculated in operation S440. Then, in operation S450, the calculated covariance matrix is added to the covariance matrixes of the group Gi. In other words, in operation S450, all the calculated covariance matrixes of the group are cumulatively added together (that is, the calculated covariance matrix is added to the within-class scatter matrixes). On the other hand, if it is determined in operation S430 that all the images in the group Gi are used to calculate the within-class scatter matrixes, a sum resulting from the addition performed in operation S450 is divided by the number of covariance matrixes corresponding to the group, to obtain a mean covariance matrix of the group, that is, within-class group scatter matrixes, and make the within-class group scatter matrixes equal to zero, in operation S460. On the other hand, if it is determined in operation S420 that all the groups of the same person are used to calculate a within-class scatter matrix, group within-class scatter matrixes of all the groups of the same person are added together, and a sum resulting from the addition is divided by the number of groups corresponding to the person in order to obtain a person within-class scatter matrix corresponding to each person of the training set, in operation S470. On the other hand, if it is determined in operation S410 that all the persons in the training set are used to calculate within-class scatter matrixes, person-within-class scatter matrixes corresponding to all the persons in the training set are added together, and a sum resulting from the addition is divided by the number of persons in the training set in order to obtain the general within-class scatter matrix Sw, in operation S480.

Figure 5:
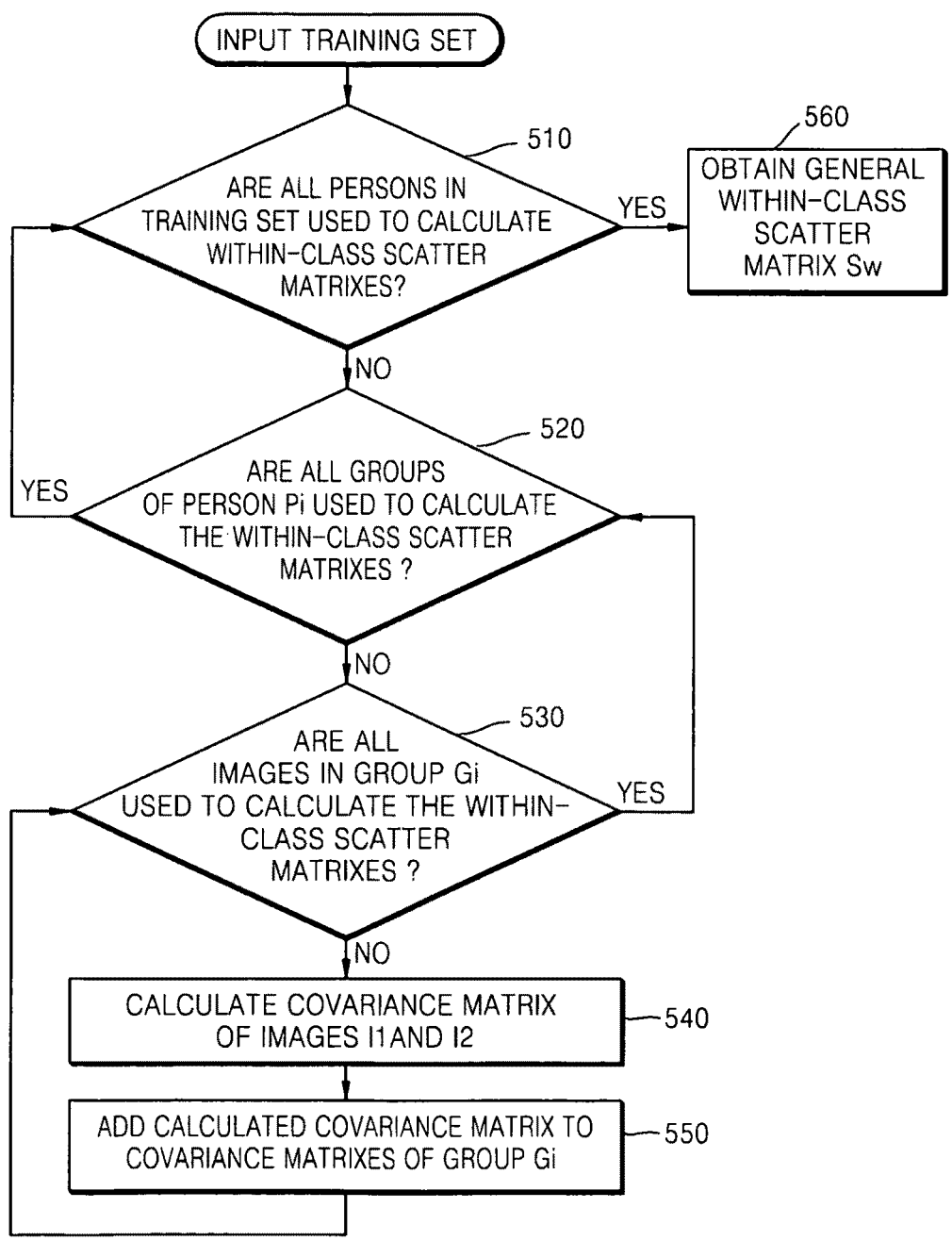
FIG. 5 is a flowchart of a method of calculating a within-class scatter matrix, according to another embodiment of the present invention.

FIG. 5 illustrates a flowchart of an operation of calculating the general within-class scatter matrix Sw using the within-class scatter matrix calculating unit 152, according to another embodiment of the present invention.

Operations S510 to S550 of FIG. 5 are the same as the operations S410 to S450 of FIG. 4, and thus the detailed description thereto will be omitted. In FIG. 5, the differences with respect to FIG. 4 include that operations S460, S470 and S480 are omitted, whereas operation S560 is added. In operation S560, the scatter matrix within class, that is, the matrix obtained by adding the covariance matrixes calculated in operation S540 together, is divided by the number of covariance matrixes calculated in operation S540 to obtain the general within-class scatter matrix Sw.

It can be known from the above description that, in spite of using the method of FIG. 4 or the method of FIG. 5 to calculate a within-class scatter matrix with respect to the training set having many images, an amount of computation is very large and much time is wasted. To satisfy the demand of real time applications, a quick method of computing a within-class scatter matrix is proposed in embodiments of the present invention. In a quick method for computing a within-class scatter matrix, according to an embodiment of the present invention, a within-class scatter matrix for each group is computed. To calculate the within-class scatter matrix, each image in a group and a mean image of all the images in the group form an image pair, and the covariance matrix of the image pair is calculated. Therefore, according to this quick method, the amount of computation is reduced and time is saved.

If the images included in a training set are classified into 8 groups according to each person and each of the groups includes 24 images, a within-class scatter matrix of a pair of an image of an arbitrary group and a mean image of the group may be calculated using Equation 5 below.

$$S_w = \sum_{m=1}^{PN} \sum_{G_n \subset P_m, n=1}^{n=8} k \cdot \left\{ \sum_{i \in G_n} [(x_i - \bar{x}_{G_n})^T \cdot (x_i - \bar{x}_{G_n})] \right\} \quad \text{Equation 5}$$

where i,j=1, 2 ... 24, $G_n$ denote the images included in a group, n=1, 2 ... 8, k denotes the number of images included in the group, $P_m$ denotes the images for an m-th person, and PN denotes the number of persons.

Figure 6:
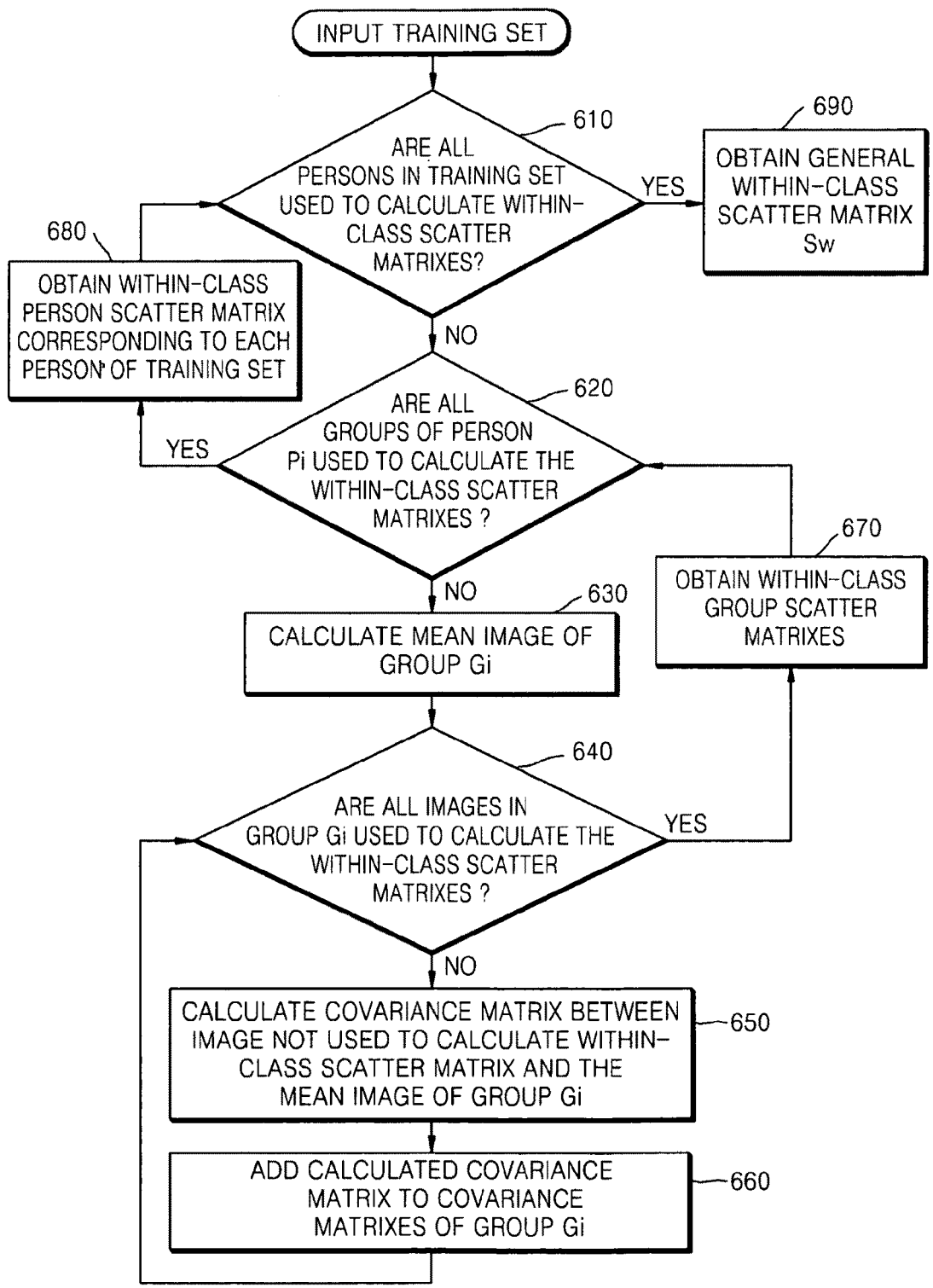
FIG. 6 is a flowchart of a method of calculating a within-class scatter matrix, according to another embodiment of the present invention.

FIG. 6 is a flowchart of a more rapid method for performing the method of FIG. 4 of computing the general within-class scatter matrix Sw.

Compared with the flowchart of FIG. 4, the flowchart of FIG. 6 further includes operation S630. In addition, operation S650 of FIG. 6 is different from operation S440 of FIG. 4. Since the other operations of FIG. 6 are the same as the corresponding operations of FIG. 4, a detailed description thereof will be omitted. A detailed description with respect to operations S630 and S650 will now be made.

If it is determined in operation S620 that a remaining group Gi of a person is not used to calculate a within-class scatter matrix, it proceeds to operation S630 to calculate the mean image of all the images in the group Gi. More specifically, all the images in the group Gi are added together, that is, intensity values or RGB values or Gabor wavelet feature values of pixels corresponding to the images in the group Gi are added together, and a sum resulting from the addition is divided by the number of images in the group Gi, to thereby obtain the mean image of the group Gi. If it is determined in operation S640 that an image in the group Gi is not used to calculate a within-class scatter matrix, it proceeds to operation S650 to calculate a difference image corresponding to a difference between the image and the mean image and to calculate a covariance matrix of the difference image. In other words, in operation S650, a covariance matrix between the image and the mean image is calculated.

Figure 7:
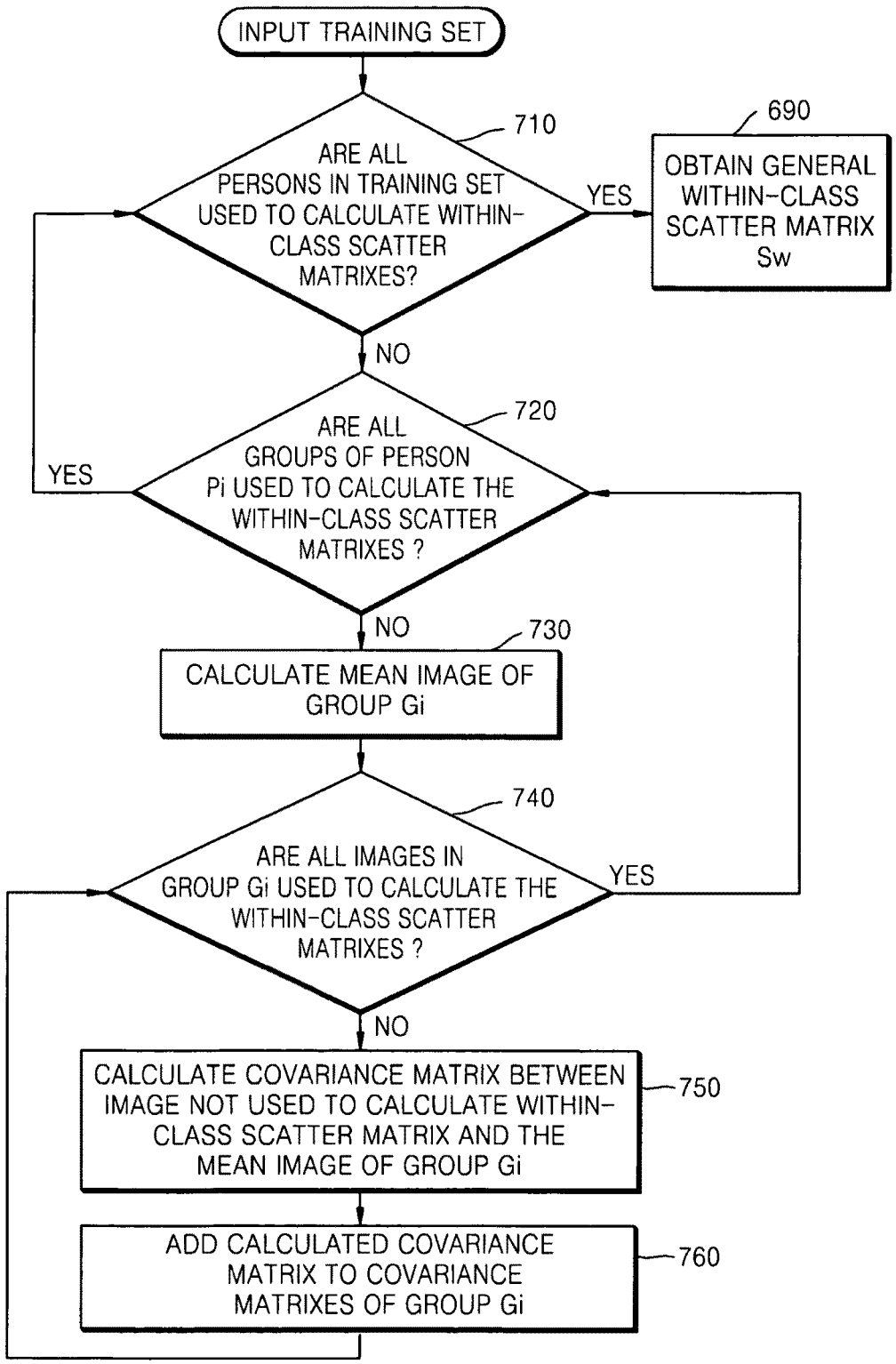
FIG. 7 is a flowchart of a method of calculating a within-class scatter matrix, according to another embodiment of the present invention.

FIG. 7 is a flowchart of a more rapid method for performing the method of FIG. 5 for calculating the general within-class scatter matrix Sw.

Operations S710 to S760 are the same as operations S610 to S660, and thus a detailed description thereof will be omitted. FIG. 7 is different from FIG. 6 in that operations S670 and S690 are omitted and operation S770 is further included. In operation S770, a sum obtained by adding the covariance matrixes, namely, the within-class scatter matrixes calculated in operation S760, is divided by the number of covariance matrixes calculated in operation S760, to thereby obtain the general within-class scatter matrix Sw.

Hereinafter, the process of the between-class scatter matrix calculating unit 153 calculating a between-class scatter matrix will be described by referring to FIG. 8 to FIG. 11. The main concept for the calculation of the between-class scatter matrix by the between-class scatter matrix calculating unit 153 is as follows: a covariance matrix between each image in each group of each person and each image of other persons is calculated, the obtained covariance matrixes of all the images in all the groups of all the persons are added together, and a sum resulting from the addition is divided by the number of calculated covariance matrixes, to thereby obtain the between-class scatter matrix.

A scatter matrix of images between different groups for the same person is not calculated. If the number of images for a person is 192, a between-class scatter matrix may be calculated using Equation 6 below.

$$S_b = \sum_{m=1}^{PN} \sum_{n=1, n \neq m}^{PN} \left\{ \sum_{i \in P_m, i=1}^{IN} \sum_{j \in P_n, j=1}^{IN} [(x_i - x_j)^T \cdot (x_i - x_j)] \right\}$$ Equation 6 where i,j=1, 2 . . . 192, IN denotes the number of images for an arbitrary person, $P_m$ denotes the images for an m-th person, and PN denotes the number of persons.

Figure 8:
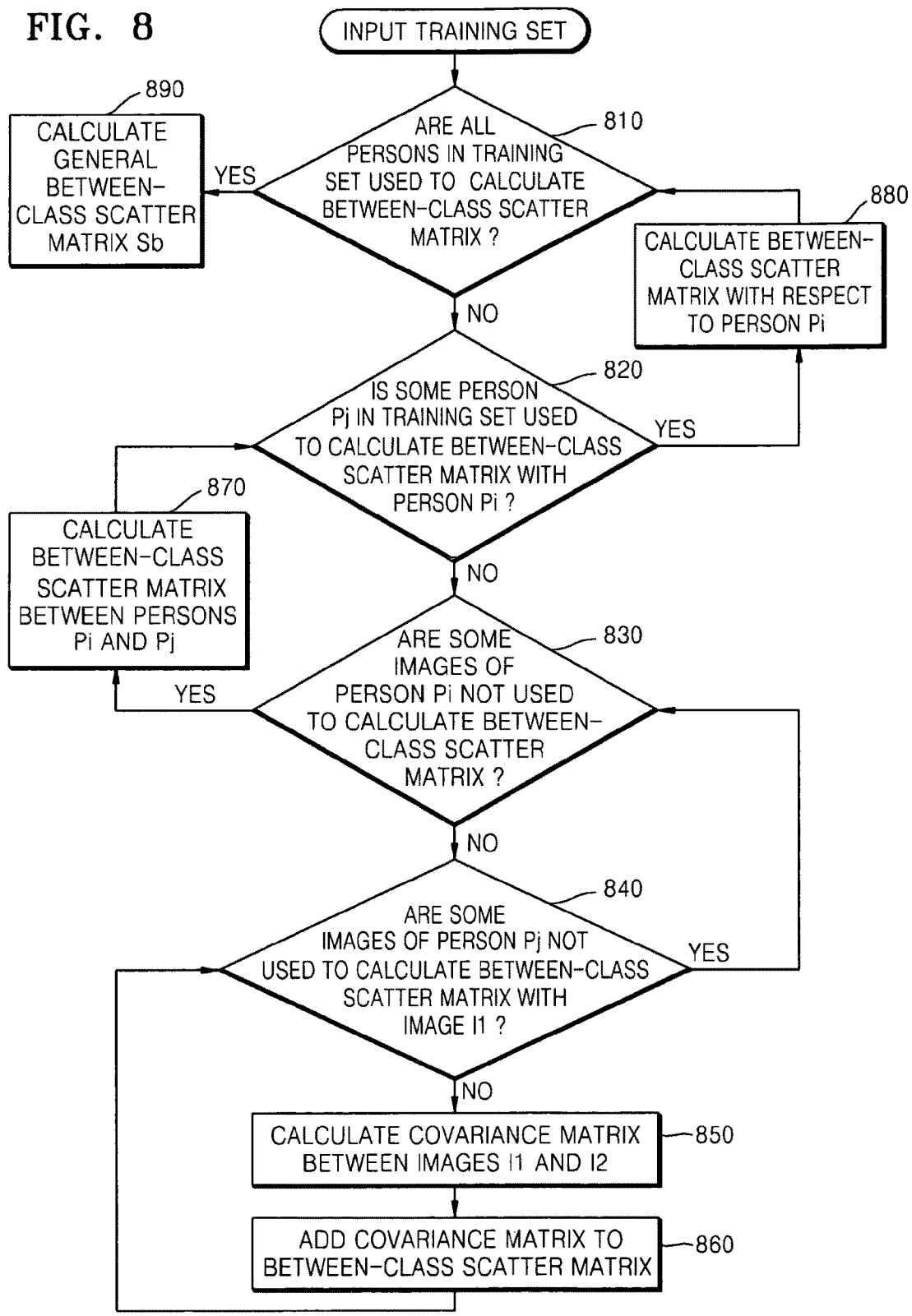
FIG. 8 is a flowchart of a method of calculating a between-class scatter matrix, according to an embodiment of the present invention.

FIG. 8 is a flowchart of a method of calculating a general between-class scatter matrix Sb, according to an embodiment of the present invention.

Referring to FIG. 8, in operation S810, it is determined whether all the persons in the training set are calculated for a between-class scatter matrix. If it is determined in operation S810 that a person Pi is not used to calculate a between-class scatter matrix, it proceeds to operation S820, to determine whether some person Pj in the training set is used to calculate a between-class scatter matrix with the person Pi. If it is determined in operation S820 that the person Pj is not used to calculate a between-class scatter matrix with the person Pi, it proceeds to operation S830 to determine whether some images of the person Pi are not used to calculate a between-class scatter matrix. If it is determined in operation S830 that an image I1 of Pi is not used to calculate a between-class scatter matrix, it proceeds to operation S840 to determine whether some images of the person Pj are not used to calculate a between-class scatter matrix with the image I1. If it is determined in operation S840 that an image I2 of the person Pj is not used to calculate a between-class scatter matrix with the image I1, it proceeds to operation S850, to calculate a covariance matrix between the image I1 and the image I2. Then, it proceeds to operation S860, to add the covariance matrix calculated in operation S850 to a between-class scatter matrix, that is, to add cumulatively all the covariance matrixes for the persons Pi and Pj calculated in operation S850 together.

On the other hand, if it is determined in operation S830 that all the images of the person Pi are used to calculate a between-class scatter matrix and it is determined in operation S840 that all the images of the person Pj are used to calculate a between-class scatter matrix, a between-class scatter matrix between the persons Pi and Pj is calculated in operation S870, that is, the between-class scatter matrix cumulatively added in operation S860 is divided by the number of between-class scatter matrixes between the persons Pi and Pj calculated in operation S860 (that is, the number of all the images of the person Pi is multiplied by the number of all the images of the person Pj, and then the product of the persons Pi and Pj is divided by 2), and the between-class scatter matrix in operation S860 is set equal to zero. If it is determined in operation S820 that all the persons in the training set are used to calculate a between-class scatter matrix with the person Pi, a between-class scatter matrix with respect to the person Pi is calculated in operation S880. That is, all the between-class scatter matrixes between the person Pi and other persons in the training set in operation S870 are added cumulatively together, and a sum resulting from the addition is divided by a difference between the number of persons included in the training set and 1. If it is determined in operation S810 that all the persons in the training set are used to calculate a between-class scatter matrix, the general between-class scatter matrix Sb is calculated in operation S890. That is, between-class scatter matrixes for the persons in the training set are added together, and then a sum resulting from the addition is divided by the number of persons in the training set.

Figure 9:
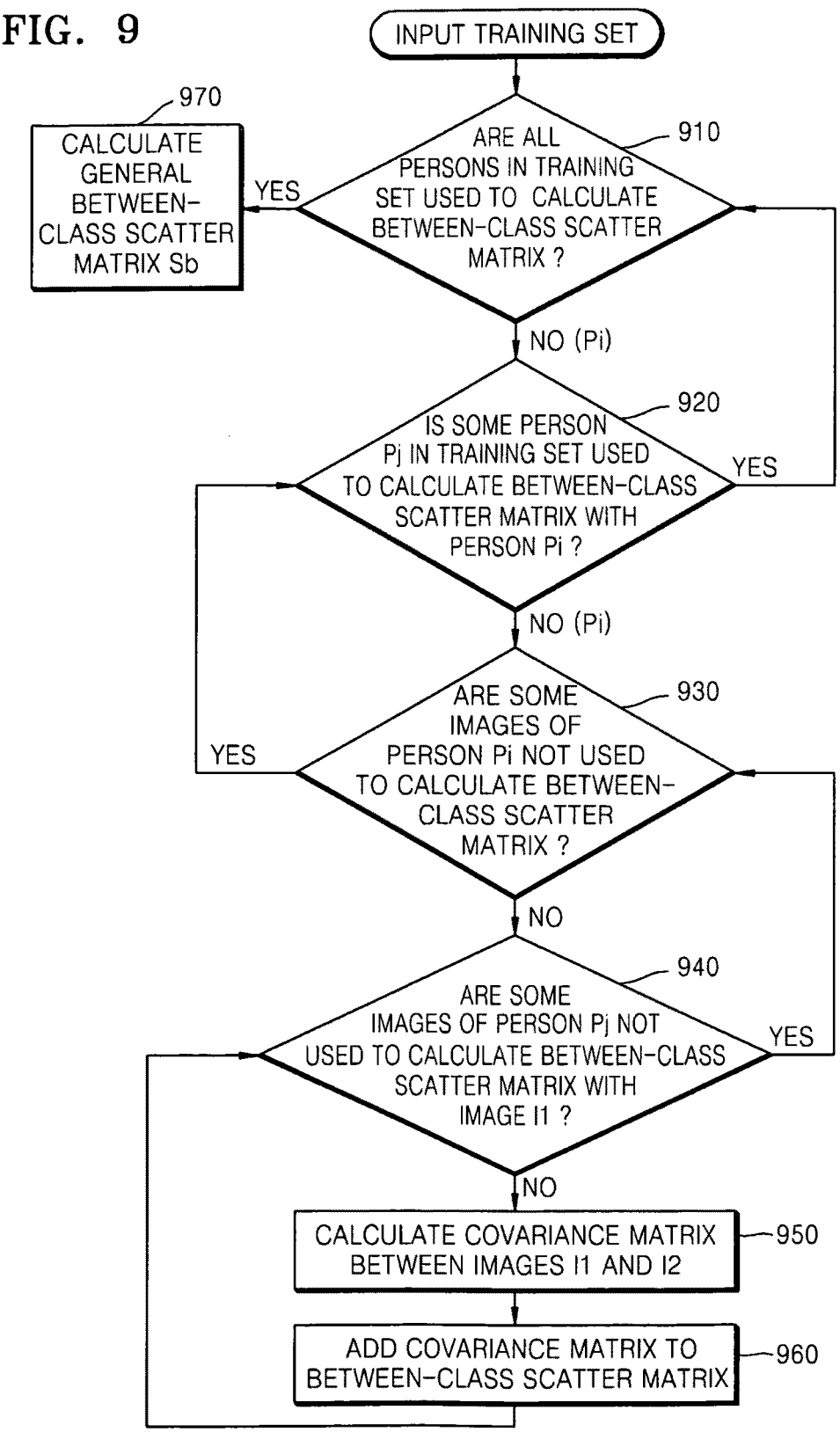
FIG. 9 is a flowchart of a method of calculating a between-class scatter matrix, according to another embodiment of the present invention.

FIG. 9 is a flowchart of a method of calculating the general between-class scatter matrix Sb, according to another embodiment of the present invention.

The operations S910 to S960 of FIG. 9 are the same as operations S810 to S860 of FIG. 8, and detailed descriptions thereof will be omitted. FIG. 9 is different from FIG. 8 in that operations S870 and S890 are omitted and operation S970 is further included. In operation S970, the between-class scatter matrix calculated in operation S960 is divided by the number of between-class scatter matrixes to obtain the general between-class scatter matrix Sb.

It can be known from the above description that an amount of computation to calculate the general between-class scatter matrix Sb in the training set having many images is very large, and that much time is wasted. To satisfy the demand of real time applications, a more rapid method for computing a between-class scatter matrix is proposed in embodiments of the present invention. In a quick method for computing a between-class scatter matrix according to an embodiment of the present invention, to compute a between-class scatter matrix for each group, a between-class scatter matrix between a mean image of each group of each person and a mean image of all the images of all the other persons in the training set, instead of a between-class scatter matrix between all the images of each person and all the images of all the other persons in the training set, is calculated. Alternatively, a between-class scatter matrix between each image in each group of each person and a mean image of all the other images in the training set is calculated. In addition, in case of a large training set, a mean image of all the images in the training set can be used to replace the mean image of all the other persons. As an embodiment of the present invention, a between-class scatter matrix will be calculated with respect to a mean image of each group of each person and the mean image of all the images in the training set, but the present invention will not be limited thereto.

If the number of groups of a person is 8, a between-class scatter matrix may be calculated using Equation 7 below.

$$S_b = \sum_{m=1}^{PN} k \cdot \left\{ \sum_{n=1, G_n \subset P_m}^{8} [(\overline{x}_{G_n} - \overline{x}_{all})^T \cdot (\overline{x}_{G_n} - \overline{x}_{all})] \right\}$$ Equation 7 where Gn denotes the images of a group, n=1, 2, . . . , and 8, k denotes the number of images of the group, Pm denotes the images of an m-th person, and PN denotes the number of persons.

Hereinafter, the quick method for calculating a between-class scatter matrix according to an embodiment will be described in detail by referring to FIGS. 10 and 11.

Figure 10:
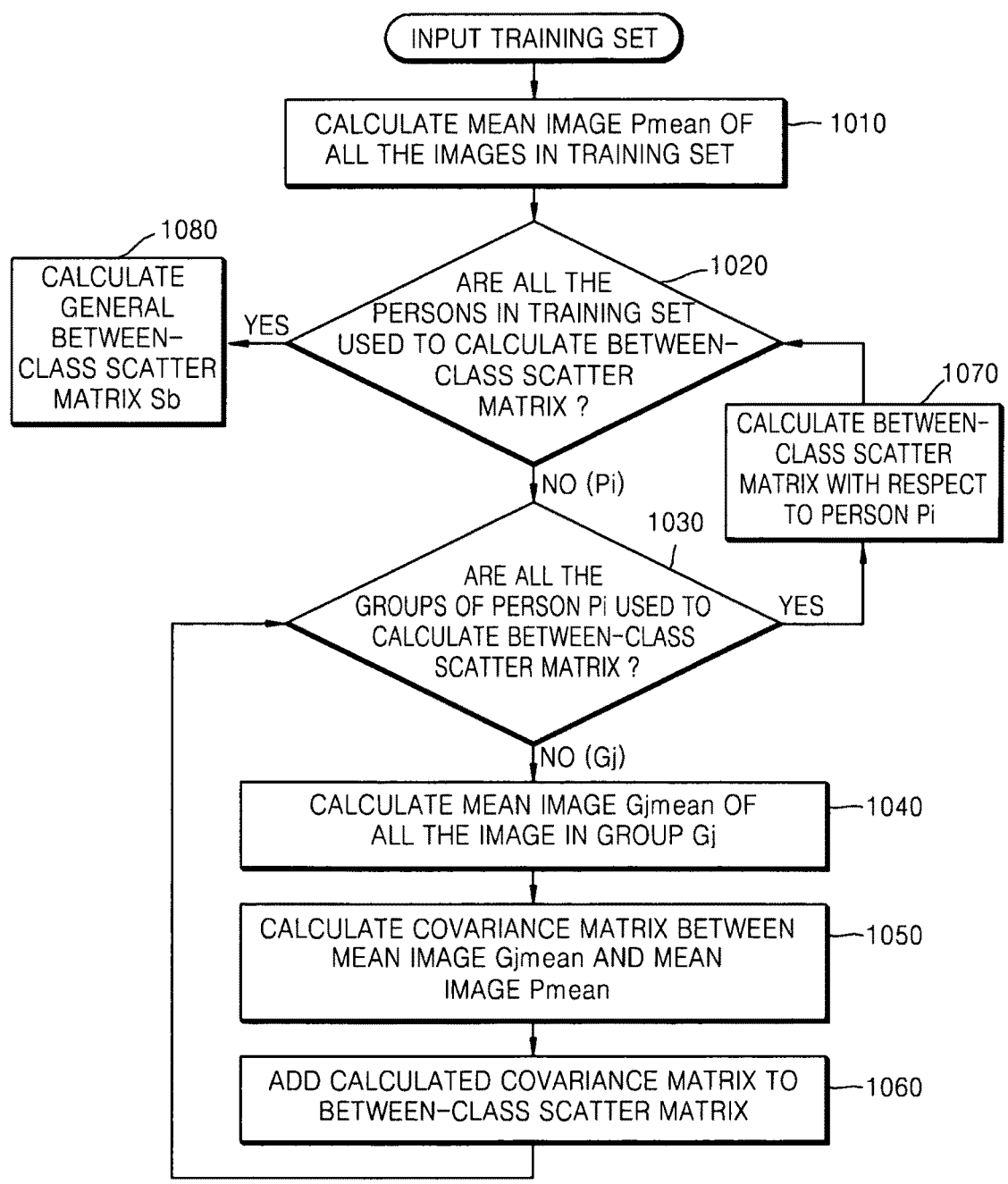
FIG. 10 is a flowchart of a method of calculating a between-class scatter matrix, according to another embodiment of the present invention.

FIG. 10 illustrates a quick method with respect to the method of FIG. 8 for calculating the general between-class scatter matrix Sb, according to an embodiment of the present invention.

In operation S1010, a mean image Pmean of all the images in the training set is calculated. In operation S1020, it is determined whether all the persons in the training set are used to calculate a between-class scatter matrix. If it is determined in operation S1020 that a person Pi is not used to calculate a between-class scatter matrix, it proceeds to operation S1030, to determine whether all the groups of the person Pi are used to calculate a between-class scatter matrix. If it is determined in operation S1030 that a group Gj of the person Pi is not used to calculate a between-class scatter matrix, it proceeds to operation S1040, to calculate a mean image Gjmean of all the image in the group Gj. Then, it proceeds to operation S1050 to calculate a covariance matrix between the mean image Gjmean of all the images in the group Gj and the mean image Pmean of all the images in the training set. Then, it proceeds to operation S1060 to add the calculated covariance matrix to a between-class scatter matrix, that is, to add cumulatively all the covariance matrixes with respect to the mean images Gjmean and Pmean in operation S1050. On the other hand, if it is determined in operation S1030 that all the groups of the person Pi are used to calculate a between-class scatter matrix, it proceeds to operation S1070 to calculate a between-class scatter matrix with respect to the person Pi, and to make a between-class scatter matrix in operation S1060 be equal to zero. On the other hand, if it is determined in operation S1020 that all the persons in the training set are used to calculate a between-class scatter matrix, it proceeds to operation S1080 to calculate the general between-class scatter matrix Sb, that is, to add between-class scatter matrixes with respect to the persons together and to divide a sum resulting from the addition by the number of training sets.

Figure 11:
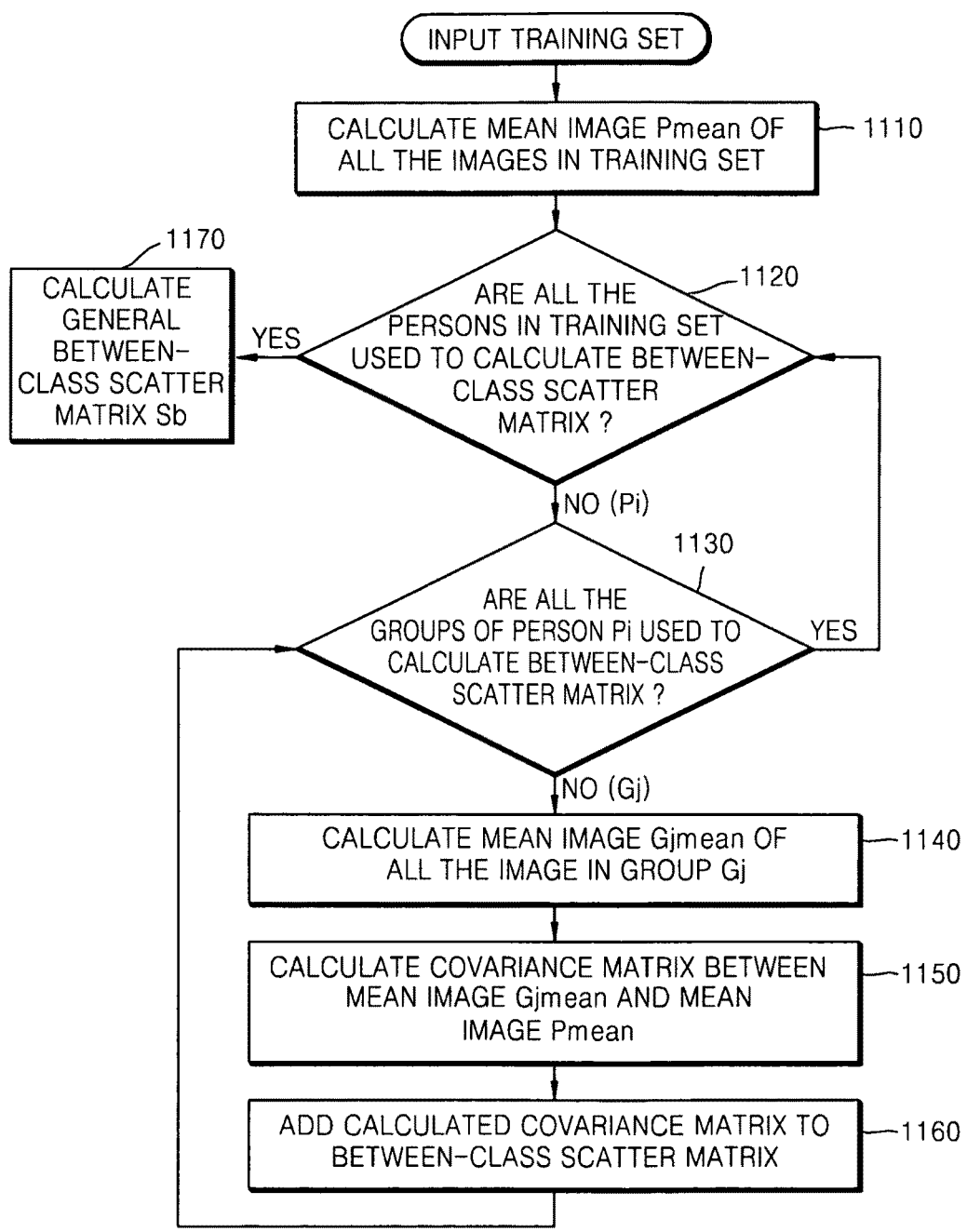
FIG. 11 is a flowchart of a method of calculating a between-class scatter matrix, according to another embodiment of the present invention.

FIG. 11 illustrates a quick computation method for the method of FIG. 9 for calculating the general between-class scatter matrix Sb, according to another embodiment of the present invention.

Operations S1110 to S1160 of FIG. 11 are the same as operations S1010 to S1060 of FIG. 10, and a detailed description thereof will therefore be omitted.

FIG. 11 is different from FIG. 10 in that operations S1070 and S1080 are omitted, and operation S1170 is further included to calculate a general between-class scatter matrix Sb, that is, to divide the scatter matrix in operation S1160 by the number of covariance matrixes calculated in operation S1150.

For illustration, in the above embodiment, a mean image of all the images in the training set is calculated in operation S1010 of FIG. 10 and operation S1110 of FIG. 11, but the invention is not limited thereto. Alternatively, after it is determined that all the images in the training set are not used to calculate a between-class scatter matrix, a mean image Pmean may be obtained by averaging all the images of other persons in the training set.

Figure 12:
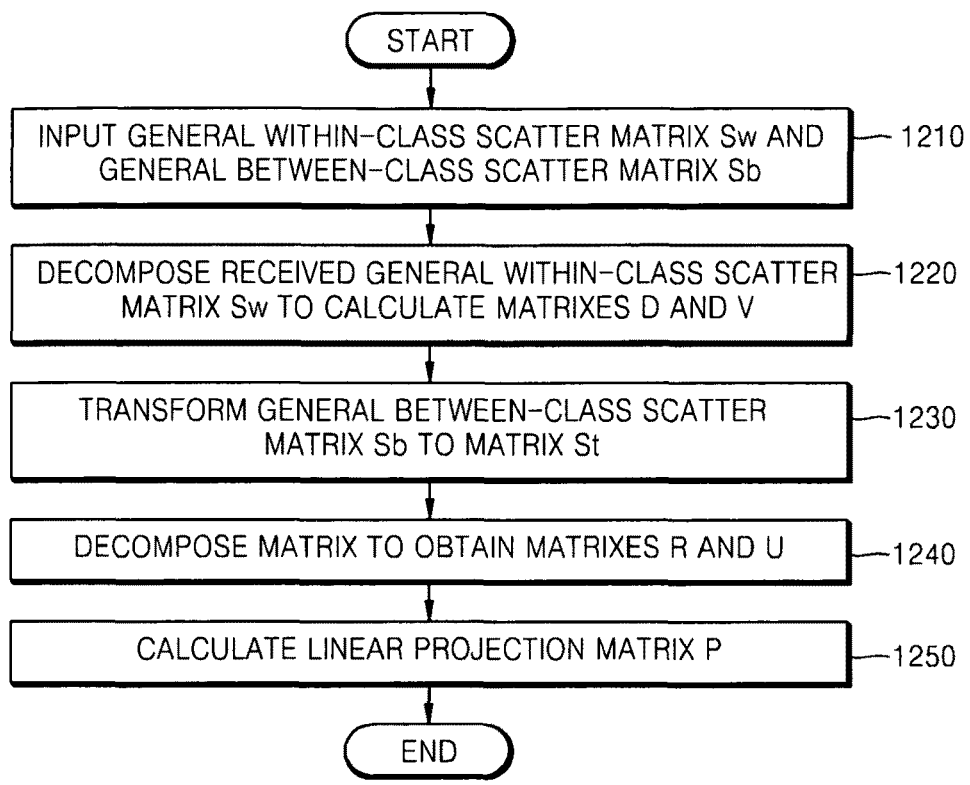
FIG. 12 is a flowchart of a conventional method of calculating a linear projection matrix.

To disclose the invention thoroughly and completely, the computation of a linear projection matrix will be described by referring to FIG. 12. FIG. 12 illustrates that the linear projection matrix calculating unit 154 calculates a linear projection matrix based on the general within-class scatter matrix Sw calculated by the within-class scatter matrix calculating unit 152 and the general between-class scatter matrix Sb calculated by the between-class scatter matrix calculating unit 153 according to the prior art.

Since the linear projection matrix is calculated according to the prior art and can be implemented by those skilled in the art according to a general description, a detailed description thereof will be omitted. Hereinafter, a process of calculating the linear projection matrix will be described by referring to FIG. 12.

As illustrated in FIG. 12, in operation S1210, the linear projection matrix calculating unit 154 receives the general within-class scatter matrix Sw and the general between-class scatter matrix Sb from the within-class scatter matrix calculating unit 152 and the between-class scatter matrix calculating unit 153, respectively. Then, in operation S1220, the linear projection matrix calculating unit 154 decomposes the received general within-class scatter matrix Sw to calculate matrixes D and V according to Equation 8 below.

$$D^{-\frac{1}{2}}V^T S_w V D^{-\frac{1}{2}} = I \qquad \text{Equation 8}$$

Then, in operation S1230, the received general between-class scatter matrix Sb is transformed to a matrix St according to Equation 9 below.

$$D^{-\frac{1}{2}}V^T S_b V D^{-\frac{1}{2}} = S_t \qquad \text{Equation 9}$$

In operation S1240, the matrix St into which the general between-class scatter matrix Sb is transformed is decomposed to obtain matrixes R and U according to Equation 10 below.

$$U^T S_t U = R \qquad \text{Equation 10}$$

In operation S1250, the linear projection matrix P is calculated based on the matrixes D and V obtained in operation S1220 and the matrixes R and U obtained in operation S1240 by using Equation 11 below.

$$P = VD^{-1/2}U \qquad \text{Equation 11}$$

Figure 13:
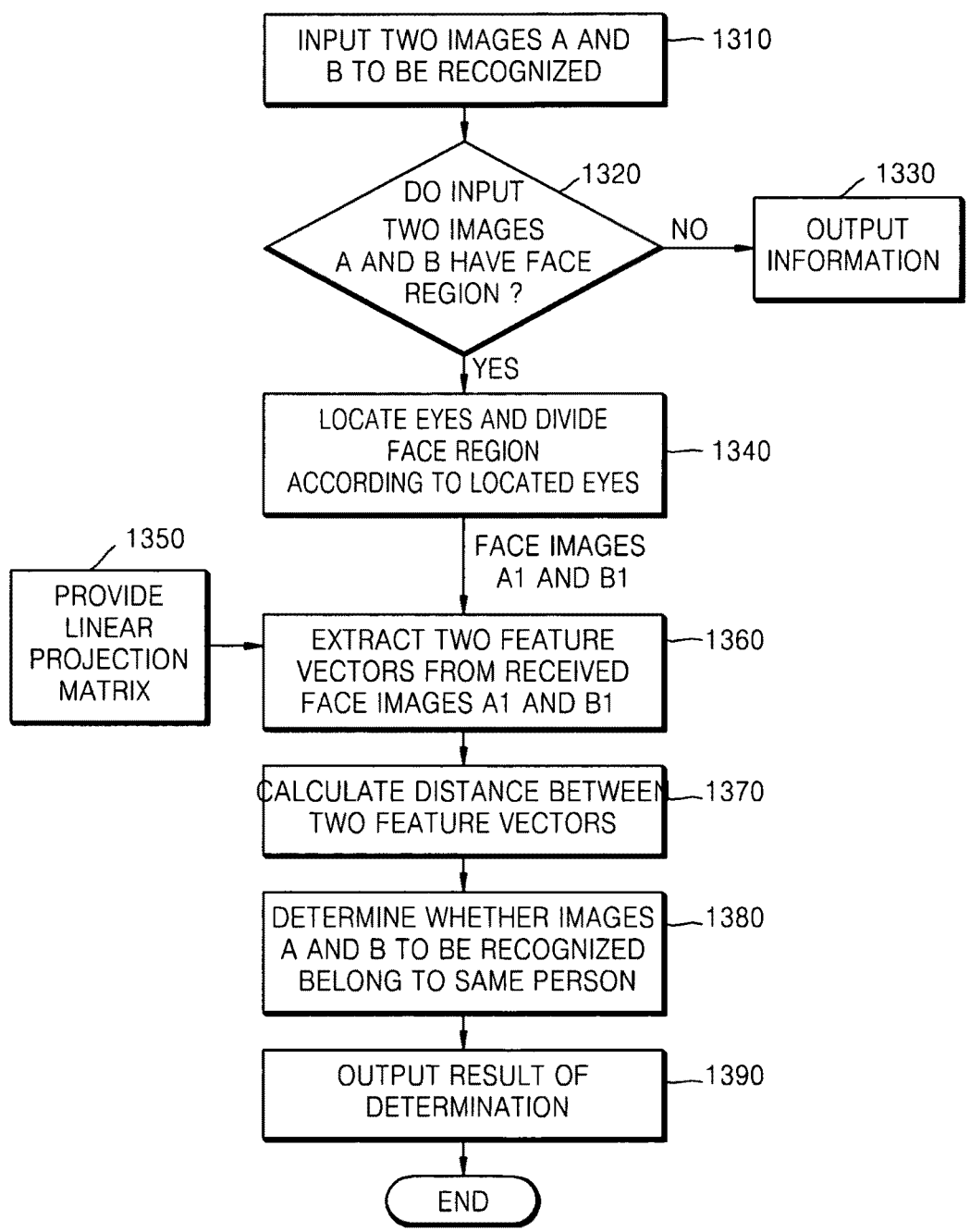
FIG. 13 is a flowchart of a face recognition method according to an embodiment of the present invention.
Figure 14:
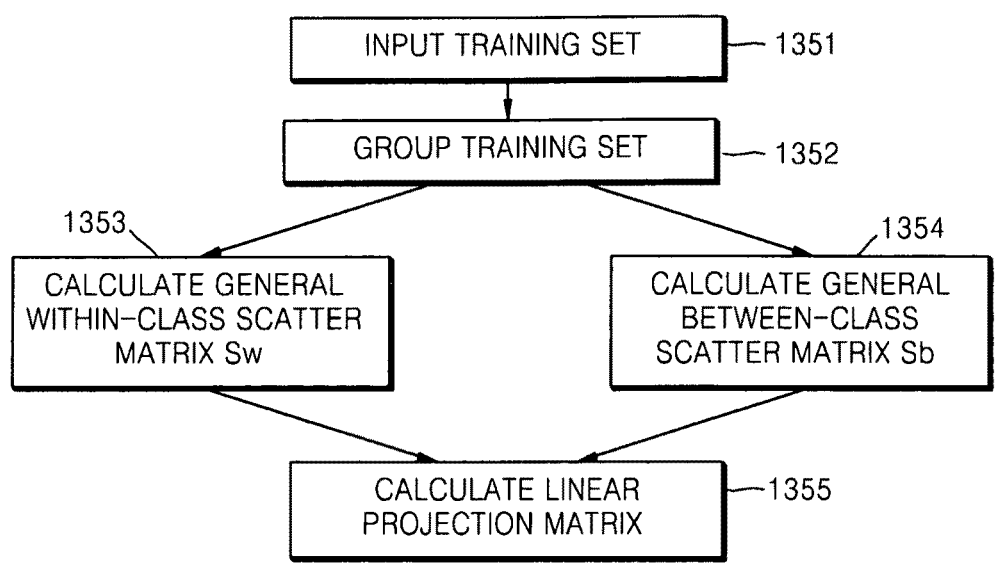
FIG. 14 is a flowchart of an operation of extracting two feature vectors from received face images, which is included in the method of FIG. 13.

FIG. 13 is a flowchart of a face recognition method according to an embodiment of the present invention. FIG. 14 is a flowchart for illustrating operation S1350 of FIG. 13 in greater detail. Hereinafter, the methods of FIG. 13 and FIG. 14 will be described in detail by referring to FIG. 1 and FIG. 2.

In operation S1310, two images A and B to be recognized are input. In operation S1320, the face detecting unit 110 illustrated in FIG. 1 automatically detects the two input images A and B to determine whether the input two images A and B have a face. If it is determined in operation S1320 that the input images A and B are not images having a face, it proceeds to operation S1330 to output information (for example, information representing that the input images are not images having a face region), for example, through text, an image on a display, or speech. On the other hand, if it is determined in operation S1320 that the input images A and B are images having face region, it proceeds to operation S1340 to locate eyes with the eye locating unit 120 of FIG. 1 and to divide a face region according to the located eyes and thus divide face images A1 and B1 in the face region cropping unit 130. The face images A1 and B1 are output to the feature extracting unit 140. In operation S1360, the feature extracting unit 140 extracts two feature vectors from the received face images A1 and B1 based on the linear projection matrix provided by the face recognition engine learning unit 150 in operation S1350. In operation S1370, the feature vector distance calculating unit 160 calculates a distance between the two feature vectors extracted in operation S1360. A description of how to calculate the distance between the two feature vectors has already been provided above, and thus a more detailed description thereof will be omitted herein. In operation S1380, it is determined whether the images A and B input in operation S1310 belong to the same person. A result of the determination may be output in operation S1390.

According to another embodiment, if the input images are face images, operations S1320 to S1340 can be omitted.

Hereinafter, a process of calculating the linear project matrix provided in operation S1350 will be described by referring to FIG. 14.

In operation S1351, a training set is input. In operation S1352, the grouping unit 151 groups the training set. Then, the grouped training set is input to the within-class scatter matrix calculating unit 152 and the between-class scatter matrix calculating unit 153. In operation S1353, the within-class scatter matrix calculating unit 152 calculates a general within-class scatter matrix Sw according to one of the methods illustrated in FIGS. 4 through 7. In operation S1354, the between-class scatter matrix calculating unit 153 calculates a general between-class scatter matrix Sb according to one of the methods illustrated in FIGS. 8 through 11. Then, in operation S1355, the linear projection matrix calculating unit 154 calculates a linear projection matrix according to the method of FIG. 12.

As described above, according to the one or more of the above embodiments, a face recognition system and a face recognition method based on grouping of images are provided, in which a new method of calculating a within-class scatter matrix and a between-class scatter matrix based on grouping is defined. The new method meets the real time demand, which greatly improves the computation speed and saves resources and time.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet. Thus, the medium may be such a defined and measurable structure including or carrying a signal or information, such as a device carrying a bitstream according to embodiments of the present invention. The medium may also be a distributed network, so that the computer readable code is stored/transferred and executed in a distributed fashion. Furthermore, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A multi-view face recognition method comprising:
   inputting two images to be recognized;
   calculating a linear projection matrix based on grouped images in a training set, wherein the calculating of the linear projection matrix comprises:
      grouping images for each person in the training set based on a similarity between the images for each person in the training set;
      calculating a general within-class scatter matrix for the grouped training set by calculating a within-class scatter matrix for each group of a same person in the training set, adding the within-class scatter matrixes of the groups of the same person, dividing a sum of the within-class scatter matrixes by the number of groups of the same person to obtain a within-class scatter matrix of each person, and dividing a sum resulting from the addition of the within-class scatter matrixes by the number of persons in the training set to obtain the general within-class scatter matrix;
      calculating a general between-class scatter matrix for the grouped training set; and
      calculating the linear projection matrix based on the general within-class scatter matrix and the general between-class scatter matrix;
   extracting two feature vectors corresponding to the two input images based on the linear projection matrix;
   calculating a distance between the two extracted feature vectors; and
   determining whether the two input images belong to a same person, based on the distance between the two feature vectors.

2. The multi-view face recognition method of claim 1, further comprising:
   performing face detection on the input images to determine whether the input images are images having a face region;
   locating eyes if it is determined that the input images are images having a face region; and
   dividing face regions from the input images based on the located eyes to obtain face images.

3. The multi-view face recognition method of claim 2, wherein if it is determined that the input images are images not having a face region, information is output.

4. The multi-view face recognition method of claim 1, wherein the calculating of the within-class scatter matrix of each group of the same person in the training set comprises:
   calculating a covariance matrix between each image in a group of the same person and another image in the group; and
   adding the covariance matrixes calculated for all the images in the group, and dividing a sum of the covariance matrixes by the number of calculated covariance matrixes, to obtain the within-class scatter matrix of the group.

5. The multi-view face recognition method of claim 1, wherein the calculating of the within-class scatter matrix of each group of a same person in the training set comprises:
   calculating a mean image of all the images in a group;
   calculating a covariance matrix between each image of the group and a mean image of the group; and
   adding calculated covariance matrixes of all the images of the group and dividing a sum of the calculated covariance matrixes by the number of calculated covariance matrixes, to obtain the within-class scatter matrix of the group.

6. The multi-view face recognition method of claim 1, wherein the calculating of the general within-class scatter matrix comprises:
   calculating a covariance matrix between each image in each group of each person in the training set and another image in the group; and
   adding the calculated covariance matrixes of the groups of each person in the training set, and dividing a sum of the calculated covariance matrixes by the number of calculated covariance matrixes, to obtain the general scatter matrix within class.

7. The multi-view face recognition method of claim 1, wherein the calculating of the general between-class scatter matrix comprises:
   calculating a mean image of all the images in each group of each person in the training set and calculating a covariance matrix between each image of each group of each person in the training set and the mean image of the group; and adding the calculated covariance matrixes and dividing a sum of the calculated covariance matrixes by the number of calculated covariance matrixes, to obtain the general scatter matrix within class.

8. The multi-view face recognition method of claim 1, wherein the calculating of the general between-class scatter matrix comprises:
   calculating a between-class scatter matrix between each person and another person in the training set;
   adding the between-class scatter matrixes between each person and others in the training set and dividing a sum of the between-class scatter matrixes by the number of calculated between-class scatter matrixes between each person and others, to obtain a between-class scatter matrix of each person; and
   adding between-class scatter matrixes of all of the persons in the training set and dividing a sum of the between-class scatter matrixes of all of the persons by the number of persons in the training set, to obtain the general between-class scatter matrix.

9. The multi-view face recognition method of claim 1, wherein the calculating of the general between-class scatter matrix comprises:
   calculating a covariance matrix between each image of each person in the training set and each image of another person in the training set; and
   adding the calculated covariance matrixes and dividing a sum of the calculated covariance matrixes by the number of calculated covariance matrixes, to obtain the general between-class scatter matrix.

10. The multi-view face recognition method of claim 1, wherein the calculating of the general between-class scatter matrix comprises:
    calculating a mean image of all the image in each group of each person, wherein the mean image is referred to as a mean image of each group;
    calculating a covariance matrix between the mean image of each group of each person and a mean image of the training set;
    adding the calculated covariance matrixes for the groups of each person and dividing a sum of the calculated covariance matrixes by the number of calculated covariance matrixes for the groups of each person, to obtain a between-class scatter matrix for each person; and
    adding between-class scatter matrixes for all of the persons in the training set and dividing a sum of the between-class scatter matrixes for all of the persons by the number of persons in the training set, to obtain the general between-class scatter matrix.

11. The multi-view face recognition method of claim 1, wherein the calculating of the general between-class scatter matrix comprises:
    calculating a mean image of all the images in each group of each person in the training set, wherein the mean image is referred to as a mean image of each group;
    calculating a mean image of all the images of the other persons in the training set, wherein the mean image is referred to as a mean image of the other persons;
    calculating a covariance matrix between the mean image of each group and the mean image of the other persons;
    adding the calculated covariance matrixes for all of the groups of each person and dividing a sum of the calculated covariance matrixes for all of the groups of each person by the number of calculated covariance matrixes for all the groups of each person, to obtain a between-class scatter matrix of each person; and
    adding the between-class scatter matrixes of all of the persons in the training set and dividing a sum of the between-class scatter matrixes of all of the persons by the number of persons in the training set, to obtain the general between-class scatter matrix.

12. The multi-view face recognition method of claim 1, wherein the calculating of the general between-class scatter matrix comprises:
    calculating a mean image of all the images in the training set, wherein the mean image is referred to as a mean image of the training set;
    calculating a mean image of all the images in each group of each person in the training set, wherein the mean image is referred to as a mean image of each group;
    calculating a covariance matrix between the mean image of the training set and the mean image of each group for each person; and
    adding the calculated covariance matrixes and dividing a sum of the calculated covariance matrixes by the number of calculated covariance matrixes, to obtain the general between-class scatter matrix.

13. The multi-view face recognition method of claim 1, wherein the calculating of the general between-class scatter matrix comprises:
    calculating a mean image of all the images in each group for each person in the training set, wherein the mean image is referred to as a mean image of each group;
    calculating a mean image of all the images for the other persons in the training set, wherein the mean image is referred to as a mean image of the other persons;
    calculating a covariance matrix between the mean image of each group and the mean image of the other persons; and
    adding the calculated covariance matrixes and dividing a sum of the calculated covariance matrixes by the number of calculated covariance matrixes, to obtain the general between-class scatter matrix.

14. The multi-view face recognition method of claim 1, wherein the grouping of the images for each person in the training set based on similarity between the images for each person in the training set comprises:
    selecting a number of images from the images of each person in the training set to serve as initial clustering centers;
    calculating a similarity between each image of the remaining images of each person and each of the initial cluster centers;
    allocating the remaining images to respective groups which are most similar to the remaining images, to form new groups;
    calculating clustering centers of the new groups; and
    repeating the similarity calculating operation, the remaining image allocating operation, and the clustering center calculation operation until a standard measurement function is convergent.

15. A multi-view face recognition system comprising:
    an inputting unit inputting two images to be recognized;
    a face recognition engine learning unit calculating a linear projection matrix based on grouped images in a training set, wherein the face recognition engine learning unit comprises:
       a grouping unit grouping images of each person in the training set based on similarity between images of each person in the training set;
       a within-class scatter matrix calculating unit calculating a general within-class scatter matrix for the grouped training set by calculating a within-class scatter matrix for each group of a same person in the training set, adding the within-class scatter matrixes of the groups of the same person, dividing a sum of the within-class scatter matrixes by the number of groups of the same person to obtain a within-class scatter matrix of each person, and dividing a sum resulting from the addition of the within-class scatter matrixes by the number of persons in the training set to obtain the general within-class scatter matrix;

a between-class scatter matrix calculating unit calculating a general between-class scatter matrix for the grouped training set; and a linear projection matrix calculating unit calculating the linear projection matrix based on the general within-class scatter matrix and the general between-class scatter matrix;

a feature extracting unit extracting two feature vectors corresponding to the two input images based on the linear projection matrix provided by the face recognition engine learning unit;

a feature vector distance calculating unit calculating a distance between the two feature vectors extracted by the feature extracting unit; and a determining unit determining whether the two input images belong to a same person, based on the distance between the two feature vectors calculated by the feature vector distance calculating unit.

16. The multi-view face recognition system of claim 15, further comprising:

a face detecting unit performing face detection on the input images to determine whether the input images are images having a face region;

an eye locating unit locating eyes if the face detecting unit determines that the input images are images having a face region;

a face region dividing unit dividing face regions from the input images based on the eyes located by the eye locating unit to obtain face images.

17. The multi-view face recognition system of claim 16, further comprising an outputting unit outputting information if the face detecting unit determines that the input images are images not having a face region.

* * * * *

UNITED STATES PATENT AND TRADEMARK OFFICE
CERTIFICATE OF CORRECTION

Page 1 of 1

PATENT NO. : 8,615,113 B2
APPLICATION NO. : 12/289071
DATED : December 24, 2013
INVENTOR(S) : Lee et al.

It is certified that error appears in the above-identified patent and that said Letters Patent is hereby corrected as shown below:

In the Claims

Column 14, Line 61, in Claim 7, delete "between-class" and insert -- within-class --, therefor.

Signed and Sealed this
Twenty-second Day of July, 2014

Michelle K. Lee
*Deputy Director of the United States Patent and Trademark Office*